(12) United States Patent
Ringseth

(10) Patent No.: US 10,423,391 B2
(45) Date of Patent: *Sep. 24, 2019

(54) AGILE COMMUNICATION OPERATOR

(71) Applicant: Microsoft Technology Licensing, LLC, Redmond, WA (US)

(72) Inventor: Paul F. Ringseth, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,448

(22) Filed: Jul. 19, 2016

(65) Prior Publication Data

US 2016/0378438 A1 Dec. 29, 2016

Related U.S. Application Data

(63) Continuation of application No. 12/975,796, filed on Dec. 22, 2010, now Pat. No. 9,395,957.

(51) Int. Cl.
*G06F 9/44* (2018.01)
*G06F 9/45* (2006.01)
*G06F 9/50* (2006.01)
*G06F 8/30* (2018.01)
*G06F 8/41* (2018.01)

(52) U.S. Cl.
CPC .............. *G06F 8/314* (2013.01); *G06F 8/31* (2013.01); *G06F 8/456* (2013.01); *G06F 9/5066* (2013.01)

(58) Field of Classification Search
CPC . G06F 8/445–8/456; G06F 8/31–8/316; G06F 9/5061–9/5077
See application file for complete search history.

(56) References Cited

U.S. PATENT DOCUMENTS

| 4,156,910 A | 5/1979 | Barton et al. |
| 5,175,856 A | 12/1992 | Van Dyke et al. |
| 5,179,702 A | 1/1993 | Spix et al. |

(Continued)

FOREIGN PATENT DOCUMENTS

| CN | 1330314 A | 1/2002 |
| CN | 101657795 A | 2/2010 |

(Continued)

OTHER PUBLICATIONS

El-Boghdadi et al., Code Generation: On the Scheduling of DAGs Using Worm-Partition, published by IEEE 2007, pp. 1-7.*

(Continued)

*Primary Examiner* — Thuy Dao
*Assistant Examiner* — Zheng Wei
(74) *Attorney, Agent, or Firm* — Dicke, Billig & Czaja, PLLC

(57) ABSTRACT

A high level programming language provides an agile communication operator that generates a segmented computational space for distributing the computational space across compute nodes. The agile communication operator decomposes the computational space into segments, causes the segments to be assigned to compute nodes, and allows the user to centrally manage and automate movement of the segments between the compute nodes. The segment movement may be managed using either a full global-view representation or a local-global-view representation of the segments.

20 Claims, 3 Drawing Sheets

(56) References Cited

U.S. PATENT DOCUMENTS

| | | | |
|---|---|---|---|
| 5,359,710 A | 10/1994 | Aono et al. | |
| 5,475,842 A * | 12/1995 | Gilbert | G06F 8/453 717/160 |
| 5,481,723 A | 1/1996 | Harris et al. | |
| 5,551,039 A | 8/1996 | Weinberg et al. | |
| 5,706,483 A * | 1/1998 | Patrick | G06F 8/443 345/562 |
| 5,710,927 A | 1/1998 | Robison | |
| 5,812,852 A | 9/1998 | Poulsen et al. | |
| 5,832,272 A * | 11/1998 | Kalantery | G06F 8/456 717/149 |
| 5,852,734 A * | 12/1998 | Komatsu | G06F 8/433 717/149 |
| 5,867,649 A | 2/1999 | Larson | |
| 5,937,194 A | 8/1999 | Sundaresan | |
| 5,999,729 A | 12/1999 | Tabloski, Jr. et al. | |
| 6,018,628 A | 1/2000 | Stoutamire | |
| 6,026,234 A | 2/2000 | Hanson et al. | |
| 6,088,511 A | 7/2000 | Hardwick | |
| 6,106,575 A | 8/2000 | Hardwick | |
| 6,260,036 B1 | 7/2001 | Almasi et al. | |
| 6,311,265 B1 | 10/2001 | Beckerle et al. | |
| 6,433,802 B1 | 8/2002 | Ladd | |
| 6,442,541 B1 | 8/2002 | Clark et al. | |
| 6,550,059 B1 | 4/2003 | Choe et al. | |
| 6,560,774 B1 | 5/2003 | Gordon et al. | |
| 6,622,301 B1 | 9/2003 | Hirooka et al. | |
| 6,708,331 B1 | 3/2004 | Schwartz | |
| 6,772,415 B1 * | 8/2004 | Danckaert | G06F 8/452 712/241 |
| 6,934,940 B2 | 8/2005 | Bates et al. | |
| 7,096,422 B2 | 8/2006 | Rothschiller et al. | |
| 7,171,655 B2 | 1/2007 | Gordon et al. | |
| 7,210,127 B1 | 4/2007 | Rangachari | |
| 7,373,640 B1 | 5/2008 | English et al. | |
| 7,464,103 B2 | 12/2008 | Siu et al. | |
| 7,533,246 B2 | 5/2009 | Taylor | |
| 7,584,342 B1 | 9/2009 | Nordquist et al. | |
| 7,584,465 B1 | 9/2009 | Koh et al. | |
| 7,689,980 B2 | 3/2010 | Du et al. | |
| 7,739,466 B2 | 6/2010 | Rozas et al. | |
| 7,757,222 B2 | 7/2010 | Liao et al. | |
| 7,800,620 B2 | 9/2010 | Tarditi, Jr. et al. | |
| 7,853,937 B2 | 12/2010 | Janczewski | |
| 7,926,046 B2 | 4/2011 | Halambi et al. | |
| 7,979,844 B2 | 7/2011 | Srinivasan | |
| 7,983,890 B2 | 7/2011 | Bliss et al. | |
| 8,010,945 B1 | 8/2011 | Kilgard et al. | |
| 8,046,745 B2 | 10/2011 | Wong | |
| 8,060,857 B2 | 11/2011 | Biggerstaff | |
| 8,127,283 B2 | 2/2012 | Sheynin et al. | |
| 8,209,664 B2 | 6/2012 | Yu et al. | |
| 8,234,635 B2 | 7/2012 | Isshiki et al. | |
| 8,245,207 B1 | 8/2012 | English et al. | |
| 8,245,212 B2 | 8/2012 | Steiner | |
| 8,296,746 B2 | 10/2012 | Takayama et al. | |
| 8,402,450 B2 | 3/2013 | Ringseth et al. | |
| 8,549,496 B2 | 10/2013 | Cooke et al. | |
| 8,589,867 B2 | 11/2013 | Zhang et al. | |
| 8,713,039 B2 | 4/2014 | Ringseth et al. | |
| 8,806,426 B2 | 8/2014 | Duffy et al. | |
| 8,813,053 B2 | 8/2014 | Wang et al. | |
| 8,813,091 B2 * | 8/2014 | Maessen | G06F 9/5066 718/105 |
| 8,839,212 B2 | 9/2014 | Cooke et al. | |
| 8,839,214 B2 | 9/2014 | Ringseth et al. | |
| 9,262,243 B2 * | 2/2016 | Archer | G06F 9/544 |
| 9,395,957 B2 | 7/2016 | Ringseth | |
| 9,430,204 B2 | 8/2016 | Levanoni et al. | |
| 9,489,183 B2 | 11/2016 | Ringseth | |
| 9,507,568 B2 | 11/2016 | Ringseth | |
| 9,639,336 B2 * | 5/2017 | Grover | G06F 8/443 |
| 9,753,708 B2 * | 9/2017 | Fink | G06F 8/456 |
| 9,910,821 B2 * | 3/2018 | Mizobuchi | G06F 9/5066 |
| 2001/0051971 A1 | 12/2001 | Kato | |
| 2002/0019971 A1 | 2/2002 | Zygmont et al. | |
| 2002/0062478 A1 | 5/2002 | Ishikawa et al. | |
| 2002/0126124 A1 | 9/2002 | Baldwin et al. | |
| 2002/0157086 A1 * | 10/2002 | Lewis | G06F 8/314 717/127 |
| 2003/0061255 A1 * | 3/2003 | Shah | G06F 8/314 718/100 |
| 2003/0145312 A1 | 7/2003 | Bates et al. | |
| 2003/0187853 A1 | 10/2003 | Hensley et al. | |
| 2004/0128657 A1 | 7/2004 | Ghiya et al. | |
| 2005/0028141 A1 | 2/2005 | Kurhekar et al. | |
| 2005/0034112 A1 | 2/2005 | Stanfill | |
| 2005/0071828 A1 | 3/2005 | Brokenshire et al. | |
| 2005/0149914 A1 | 7/2005 | Krapf et al. | |
| 2005/0210023 A1 | 9/2005 | Barrera et al. | |
| 2006/0036426 A1 | 2/2006 | Barr et al. | |
| 2006/0095901 A1 * | 5/2006 | Brokenshire | G06F 9/322 717/151 |
| 2006/0098019 A1 | 5/2006 | Tarditi, Jr. et al. | |
| 2006/0130012 A1 | 6/2006 | Hatano et al. | |
| 2006/0276998 A1 | 12/2006 | Gupta et al. | |
| 2007/0011267 A1 | 1/2007 | Overton et al. | |
| 2007/0074195 A1 | 3/2007 | Liao et al. | |
| 2007/0079300 A1 | 4/2007 | Du et al. | |
| 2007/0127814 A1 | 6/2007 | Fluck et al. | |
| 2007/0169042 A1 | 7/2007 | Janczewski | |
| 2007/0169061 A1 | 7/2007 | Bera et al. | |
| 2007/0198710 A1 | 8/2007 | Gopalakrishnan | |
| 2007/0233765 A1 | 10/2007 | Gupta et al. | |
| 2007/0294665 A1 | 12/2007 | Papakipos et al. | |
| 2007/0294666 A1 | 12/2007 | Papakipos et al. | |
| 2008/0005547 A1 | 1/2008 | Papakipos et al. | |
| 2008/0120594 A1 | 5/2008 | Lucas et al. | |
| 2008/0127146 A1 | 5/2008 | Liao et al. | |
| 2008/0134150 A1 | 6/2008 | Wong | |
| 2008/0162385 A1 | 7/2008 | Madani et al. | |
| 2008/0178165 A1 | 7/2008 | Baker | |
| 2008/0235675 A1 | 9/2008 | Chen | |
| 2009/0064115 A1 | 3/2009 | Sheynin et al. | |
| 2009/0089560 A1 | 4/2009 | Liu et al. | |
| 2009/0089767 A1 | 4/2009 | Daynes et al. | |
| 2009/0113404 A1 | 4/2009 | Takayama et al. | |
| 2009/0125882 A1 | 5/2009 | Frigo et al. | |
| 2009/0144747 A1 | 6/2009 | Baker | |
| 2009/0178053 A1 | 7/2009 | Archer et al. | |
| 2009/0204789 A1 | 8/2009 | Gooding et al. | |
| 2009/0254892 A1 * | 10/2009 | Yamashita | G06F 8/456 717/146 |
| 2009/0271774 A1 | 10/2009 | Gordy et al. | |
| 2009/0307674 A1 | 12/2009 | Ng et al. | |
| 2009/0307699 A1 | 12/2009 | Munshi et al. | |
| 2010/0005080 A1 | 1/2010 | Pike et al. | |
| 2010/0031267 A1 * | 2/2010 | Maessen | G06F 9/5066 718/105 |
| 2010/0082724 A1 | 4/2010 | Diyankov et al. | |
| 2010/0083185 A1 | 4/2010 | Sakai | |
| 2010/0094924 A1 | 4/2010 | Howard et al. | |
| 2010/0131444 A1 | 5/2010 | Gottlieb et al. | |
| 2010/0146245 A1 | 6/2010 | Yildiz et al. | |
| 2010/0174883 A1 | 7/2010 | Lerner et al. | |
| 2010/0199257 A1 | 8/2010 | Biggerstaff | |
| 2010/0218196 A1 * | 8/2010 | Leung | G06F 8/453 718/107 |
| 2010/0229161 A1 | 9/2010 | Mori | |
| 2010/0235815 A1 | 9/2010 | Maybee et al. | |
| 2010/0241646 A1 | 9/2010 | Friedman et al. | |
| 2010/0241827 A1 | 9/2010 | Yu et al. | |
| 2010/0275189 A1 | 10/2010 | Cooke et al. | |
| 2010/0293534 A1 | 11/2010 | Andrade et al. | |
| 2011/0010690 A1 * | 1/2011 | Howard | G06F 8/456 717/120 |
| 2011/0131558 A1 * | 6/2011 | Young | G06F 8/314 717/145 |
| 2011/0131559 A1 * | 6/2011 | Young | G06F 8/314 717/145 |
| 2011/0271263 A1 | 11/2011 | Archer et al. | |
| 2011/0276789 A1 | 11/2011 | Chambers et al. | |

(56) References Cited

U.S. PATENT DOCUMENTS

| | | | |
|---|---|---|---|
| 2011/0302651 A1* | 12/2011 | Bates | G06F 8/456 726/22 |
| 2011/0314256 A1 | 12/2011 | Callahan et al. | |
| 2011/0314444 A1 | 12/2011 | Zhang et al. | |
| 2012/0005662 A1 | 1/2012 | Ringseth et al. | |
| 2012/0089961 A1 | 4/2012 | Ringseth | |
| 2012/0124564 A1 | 5/2012 | Ringseth et al. | |
| 2012/0131552 A1 | 5/2012 | Levanoni et al. | |
| 2012/0151459 A1 | 6/2012 | Ringseth | |
| 2012/0166444 A1 | 6/2012 | Ringseth et al. | |
| 2012/0166771 A1 | 6/2012 | Ringseth | |
| 2014/0109039 A1 | 4/2014 | Cooke et al. | |
| 2015/0248474 A1* | 9/2015 | Bornhoevd | G06F 8/20 707/764 |
| 2016/0371061 A1 | 12/2016 | Levanoni et al. | |
| 2017/0083301 A1 | 3/2017 | Ringseth | |

FOREIGN PATENT DOCUMENTS

| | | |
|---|---|---|
| CN | 101739281 A | 6/2010 |
| JP | 5-298272 | 11/1993 |
| JP | H07253955 | 10/1995 |
| JP | 2003016045 | 1/2003 |
| WO | 2012053017 | 4/2012 |

OTHER PUBLICATIONS

Goumas et al., An Efficient Code Generation Technique for Titled Iteration Spaces, Published by IEEE Transaction on Parallel and distributed Systems, vol. 14, No. 10, Oct. 2003, pp. 1021-1034.*

Shih et al., Efficient Index Generation for Compiling Two-Level Mappings in Data-Parallel Programs, Published by Journal of Parallel and Distributed Computing 60, pp. 189-216 (Year: 2000).*

Guzev et al., Asynchronous Parallel Programming Language Based on the Microsoft .NET Platform, published by PaCT 2003, LNCS 2763, Springer-Verlag Berlin Heidelberg, pp. 236-243 (Year: 2003).*

The Notice of Allowance for U.S. Appl. No. 12/902,404 dated Jun. 22, 2016 (21 pages).

The Notice of Allowance for U.S. Appl. No. 12/949,908 dated Apr. 25, 2016 (36 pages).

The Notice of Allowance for U.S. Appl. No. 12/963,868 dated Mar. 15, 2016 (10 pages).

The Notice of Allowance for U.S. Appl. No. 12/963,868 dated Jul. 18, 2016 (10 pages).

Belter, et al., "Automatic Generation of Tiled and Parallel Linear Algebra Routines", Retrieved at << http://vecpar.fe.up.pt/2010/workshops-iWAPT/Belter-Siek-Karlin-Jessup.pdf >>, Jul. 5, 2010, pp. 15.

Mattson, Tim, "Data Parallel Design Patterns", Retrieved at << http://parlab.eecs.berkeley.edu/wiki/_media/patterns/data_parallel.pdf >>, Jul. 5, 2010, pp. 7.

Brodman, et al., "New Abstractions for Data Parallel Programming", Retrieved at << http://www.usenix.org/event/hotpar09/tech/full_papers/brodman/brodman_html/ >>, Proceedings of the First USENIX conference on Hot topics in parallelism, 2009, pp. 11.

Gan, GE, "Tile Reduction: the first step towards tile aware parallelization in OpenMP", Retrieved at << https://iwomp.zih.tu-dresden.de/downloads/TileReduction-Gan.pdf >>, Jul. 5, 2010, pp. 19.

Du, et al., "A Tile-based Parallel Viterbi Algorithm for Biological Sequence Alignment on GPU with CUDA", Retrieved at << http://www.hicomb.org/papers/HICOMB2010-03.pdf >>, Parallel & Distributed Processing, Workshops and Phd Forum (IPDPSW), 2010 IEEE International Symposium on, Apr. 19-23, 2010, pp. 8.

Goumas, et al., "Data Parallel Code Generation for Arbitrarily Tiled Loop Nests", Retrieved at << http://www.cslab.ece.ntua.gr/~maria/papers/PDPTA02.pdf >>, Proceedings of the International Conference on Parallel and Distributed Processing Techniques and Applications, vol. 2, Jun. 24-27, 2002, pp. 7.

Hadri, et al., "Enhancing Parallelism of Tile QR Factorization for Multicore Architectures", Retrieved at << http://www.hetlib.org/lapack/lawnspdf/lawn222.pdf >>, Dec. 2009, pp. 19.

"International Search Report and Written Opinion", dated Apr. 10, 2012, Application No. PCT/US2011/053017, Filed Date: Sep. 23, 2011, pp. 9.

Hammes, et al., "The SA-C Language—Version 1.0", Retrieved at <<www.cs.colostate.edu/cameron/Documents/sassy.pdf>>, Technical manual, Jun. 21, 2001, pp. 1-30.

Hammes, et al., "High Performance Image Processing on FPGAs", Retrieved at <<www.cs.colostate.edu/cameron/Publications/hammes_lacsi01.pdf>>, Los Almos Computer Science Institute Symposium, Santa Fe, NM, Oct. 15-18, 2001, pp. 10.

The Office Action for U.S. Appl. No. 12/902,404 dated Nov. 9, 2012 (26 pgs.).

The Final Office Action for U.S. Appl. No. 12/902,404 dated May 24, 2013 (21 pgs.).

The Office Action for U.S. Appl. No. 12/902,404 dated Oct. 2, 2013 (22 pgs.).

The Final Office Action for U.S. Appl. No. 12/902,404 dated Feb. 28, 2014 (21 pgs.).

Applicant-Initiated Interview Summary for U.S. Appl. No. 12/902,404 dated Jun. 23, 2014 (3 pgs.).

Doman, et al., "PARADOCS: A Highly Parallel Dataflow Computer and Its Dataflow Language", In Journal: Microprocessing and Microprogramming, vol. 7, Issue 1, Jan. 1, 1981, 12 Pages.

The Office Action for U.S. Appl. No. 12/902,404 dated Jan. 2, 2015 (29 pgs.).

The Notice of Allowance for U.S. Appl. No. 12/947,989 dated Nov. 29, 2012 (16 pgs.).

Nagaraja, et al., "A Parallel Merging Algorithm and Its Implementation With Java Threads", Retrieved at << http://citeseerx.ist.psu.edu/viewdoc/download?doi=10.1.1.90.2389&rep=rep1&type=pdf>>, Proceedings of MASPLAS'01 The Mid-Atlantic Student Workshop on Programming Languages and Systems, Apr. 27, 2001, p. 15.1-15.7.

Singhai, et al., "A Parametrized Loop Fusion Algorithm for Improving Parallelism and Cache Locality", Retrieved at << http://citeseerx.ist.psu.edu/viewdoc/download;jsessionid=7CFB7671C0A7F17205BA6BDB9BA66043?doi=10.1.1.105.6940&rep=rep1&type=pdf >>, The Computer Journal, vol. 40, No. 6, 1997, p. 340-355.

Yang, et al, "Integrating Parallel Algorithm Design With Parallel Machine Models", Retrieved at << http://www.dis.eafit.edu.co/depto/documentos/p131-yang - INTEGRATING PARALLEL ALGORITHM DESIGN WITH PARALLEL MACHINE MODELS.pdf >>, vol. 27, No. 1, Mar. 1995, p. 131-135.

Peter M. Kogge et al., A Parallel Algorith for the Efficient Solution of a General Class of Recurrence Equations, IEEE vol. C-22 Issue 8, Aug. 1973, [Retrieved on Aug. 29, 2012]. Retrieved from the internet: <URL: http://ieeexplore.ieee.org/stamp/stamp.jsp?tp=&arnumber=5009159> 8 Pages. (786-793).

Peiyi Tang et al., Processor Self-Scheduling for Multiple-Nested Parallel Loops, IEEE, 1986, [Retrieved on Aug. 29, 2012]. Retrieved from the internet: <URL: http://www.ualr.edu/pxtang/papers/icpp86.pdf> 8 Pages. (528-535).

John H. Reif, An optimal Parallel Algorith for Integer Sorting, Oct. 1985, [Retrieved on Aug. 29, 2012]. Retrieved from the internet: <URL: http://ieeexplore.ieee.org/stamp/stamp.jsp?tp=&arnumber=4568176> 9 Pages. (496-504).

"International Search Report", dated May 16, 2012, Application No. PCT/US2011/058637, Filed Date: Oct. 31, 2011, pp. 8.

Catanzaro, Bryan et al., "Copperhead: Compiling an Embedded Data Parallel Language," Electrical Engineering and Computer Sciences, University of California at Berkeley, pp. 12, (Oct. 16, 2010).

Svensson Joel, et al., "GPGPU Kernal Implementation and Refinement Using Obsidian," Procedia Computer Science, vol. 1, No. 1, pp. 2065-2074.

Sato, Shigeyuki et al., A Skeletal Parallel Framework with Fusion Optimizer for CPCPU Programming, Programming Languages and Systems, pp. 79-94 (2009).

(56) References Cited

OTHER PUBLICATIONS

Lee, Sean et al., "GPU Kernels as Data-Parallel Array Computations in Haskell," Workshop on Exploiting Parallelism using GPUs and other Hardware-Assisted Methods (EPHAM) pp. 1-10 (Mar. 22, 2009).
The Office Action for U.S. Appl. No. 12/949,908 dated Feb. 4, 2013 (22 pgs).
Yair Shapira, "Solving Pdes in C++: Numerical methods in a unified Object-oriented Approach", SIAM, Jan. 13, 2006.
The Final Office Action for U.S. Appl. No. 12/949,908 dated Aug. 27, 2013 (16 pgs).
The Advisory Action for U.S. Appl. No. 12/949,908 dated Nov. 12, 2013 (2 pgs).
The Examiner-Initiated Interview Summary for U.S. Appl. No. 12/949,908 dated Jan. 14, 2014 (2 pgs).
The Applicant-Initiated Interview Summary for U.S. Appl. No. 12/949,908 dated Jan. 21, 2014 (4 pgs).
The Office Action for U.S. Appl. No. 12/949,908 dated Feb. 13, 2014 (18 pgs).
The Final Office Action for U.S. Appl. No. 12/949,908 dated Jun. 26, 2014 (21 pgs).
The Office Action for U.S. Appl. No. 12/949,908 dated Nov. 3, 2014 (24 pgs).
The Final Office Action for U.S. Appl. No. 12/949,908 dated Apr. 16, 2015 (21 pgs).
Chien, Andrew A., "ICC++-A C++ Dialect for High Performance Parallel Computing", Retrieved at << http://delivery.acm.org/10.1145/250000/240740/p19-chien.pdf?key1=240740&key2=9793729721&coll=GUIDE&dl=GUIDE&CFID=97193401&CFTOKEN=57231285 >>, vol. 4, No. 1, 1996, p. 19-23.
"Const Correctness", Retrieved at << http://www.cprogramming.com/tutorial/const_correctness.html >>, retrieved date; Jul. 16, 2010, pp. 4.
Wu, et al., "GPU-Accelerated Large Scale Analytics", Retrieved at << http://www.hpl.hp.com/techreports/2009/HPL-2009-38.pdf >>, Mar. 6, 2009, pp. 11.
"Const and Immutable", Retrieved at << http://www.digitalmars.com/d/2.0/const3.html >>, Retrieved date: Jul. 16, 2010, pp. 7.
Avila, Rafael Rohrer, "A comparative study on DPC++ and other concurrent object-oriented languages", Retrieved at << http://www.google.co.uk/url?sa=t&source=web&cd=1&ved=0CBcQFjAA&url=http%3A%2F%2Fciteseerx.ist.psu.edu%2Fviewdoc%2Fdownload%3Fdoi%3D10.1.1.27.3438%26rep%3Drep1%26type%3Dpdf&ei=YN0_TOrSFob20wSvnLWQBw&usg=AFQjCNHWqmYZDo5OQaGXW7NbLEIhxhMG5A >>, Dec. 1997, pp. 1-41.
The Office Action for U.S. Appl. No. 12/977,406 dated Aug. 31, 2012 (14 pgs).
The Final Office Action for U.S. Appl. No. 12/977,406 dated Feb. 20, 2013 (17 pgs).
The Office Action for U.S. Appl. No. 12/977,406 dated Jul. 18, 2013 (19 pgs).
The Notice of Allowance for U.S. Appl. No. 12/977,406 dated Dec. 11, 2013 (21 pgs).
R Jagannathan et al. "GLU_ A High_Level System for Granular Data_Parallel Programming",Oct. 1995 pp. 1-25.
Mark Chu-Carroll et al. "Design and Implementation of a General Purpose Parallel Programming System," Department of Computer and Information Sciences University of Delaware, Nov. 14, 1995, pp. 1-9.
Diaconescu, Roxana et al. "Reusable and Extensible High Level Data Distributions", Workshop on Patterns in High Performance Computing, May 4-6, 2005, University of Illinois at Urbana-Champaign, pp. 1-10.
Petricek, Tomas, "Accelerator and F# (III.): Data-Parallel programs using F# quotations". <<http://tomasp.net/blog/accelerator-dataparallel.aspx>> Retrieved Oct. 20, 2010. pp. 2-9.
"Array Building Blocks: A Flexible Parallel Programming Model for Multicore and Many-Core Architectures" <<http://www.drdobbs.com/go-parallel/article/showArticle.jhtml:jsessionid=51NYX1OZXP>> Retrieved Oct. 20, 2010. pp. 1-4.
Hains, et al., "Array Structures and Data-Parallel Algorithms" Laboratoire d'informatique fondamentale d'Orleans, BP6759-45067 Orleans Cedex 2, France. pp. 1-8.
Keller, et al., "Regular, Shape-polymorphic, Parallel Arrays in Haskell", <<http://www.cse.unsw.edu.au/~chak/papers/KCLPL10.html>> Retrieved Dec. 2010. pp. 1-12.
Hermann, et al., "Size Inference of Nested Lists in Functional Programs" Fakultat fur Mathematik und Informatik, Universitat Passau, Germany. pp. 1-16.
The Office Action for U.S. Appl. No. 12/963,868 dated May 21, 2013 (20 pgs.).
The Final Office Action for U.S. Appl. No. 12/963,868 dated Dec. 10, 2013 (18 pgs.).
The Office Action for U.S. Appl. No. 12/963,868 dated Jun. 20, 2014 (19 pgs.).
The Final Office Action for U.S. Appl. No. 12/963,868 dated Jan. 26, 2015 (19 pgs.).
Blelloch, et al., "Implementation of a Portable Nested Data-Parallel Language", Retrieved at << http://www.cs.cmu.edu/~jch/publications/nesl-ppopp93.pdf >>, Fourth ACM SIGPLAN Symposium on Principles and Practice of Parallel Programming (PPoPP), ACM, 1993, pp. 10.
Chakravarty, et al., "V-Nested Parallelism in C", Retrieved at << http://citeseerx.ist.psu.edu/viewdoc/download?doi=10.1.1.55.8578&rep=rep1&type=pdf >>, Programming Models for Massively Parallel Computers, Oct. 9-12, 1995, pp. 1-9.
Miao, et al., "Extracting Data Records from the Web Using Tag Path Clustering", Retrieved at << http://www2009.org/proceedings/pdf/p981.pdf >>, The 18th International World Wide Web Conference, Apr. 20-24, 2009, pp. 981-990.
Emoto, et al., "Generators-of-generators Library with Optimization Capabilities in Fortress", Retrieved at << http://research.nii.ac.jp/~hu/pub/europar10.pdf >>, 16th International European Conference on Parallel and Distributed Computing (EuroPar 2010), Aug. 31-Sep. 3, 2010, pp. 1-12.
Sengupta, et al., "Efficient Parallel Scan Algorithms for GPUs", Retrieved at << http://mgarland.org/files/papers/nvr-2008-003.pdf >>, NVIDIA Technical Report NVR-2008-003, Dec. 2008, pp. 1-17.
Takahashi, et al., "Efficient Parallel Skeletons for Nested Data structures", Retrieved at << http://research.nii.ac.jp/~hu/pub/pdpta2001-TIH.pdf >>, The International Conference on Parallel and Distributed Processing Techniques and Applications, (PDPTA), Jun. 25-28, 2001, pp. 7.
Blelloch, et al., "Segmented Operations for Sparse Matrix Computation on Vector Multiprocessors" School of Computer Science, Carnegie Mellon University, Pittsburgh, PA 15213, Aug. 1993, CMU-CS-93-173, pp. 1-23.
Garland et al., "Efficient Sparse Matrix-Vector Multiplication on CUDA", NVIDIA Technical Report NVR-2009-004, Dec. 2008, pp. 1-32.
Blelloch, et al., "Scans as Primitive Parallel Operations," IEEE Transactions on Computers, vol. 38, No. 11, pp. 1526-1538, Nov. 1989.
Chamberlain, et al., "User-Defined Distributions and Layouts in Chapel: Philosophy and Framework", Retrieved at << http://chapel.cray.com/publications/hotpar10-final.pdf >>, 2nd USENIX Workshop on Hot Topics in Parallelism, Jun. 2010, pp. 6.
Diaconescu, et al., "An Approach to Data Distributions in Chapel", Retrieved at << http://citeseerx.ist.psu.edu/viewdoc/download?doi=10.1.1.94.8748&rep=rep1&type=pdf >>, International Journal of High Performance Computing Applications, vol. 21, No. 3, Aug. 2007, pp. 313-335.
Moore, Reagan W., "Digital Libraries, Data Grids, and Persistent Archives", Retrieved at << http://www.sdsc.edu/NARA/Publications/Web/RICE-DL-12-01.ppt >>, Jan. 30, 2002, pp. 30.
Chang, et al., "Bigtable: A Distributed Storage System for Structured Data", Retrieved at << http://labs.google.com/papers/bigtable-osdi06.pdf >>, In Proceedings of the 7th Conference on USENIX Symposium on Operating Systems Design and Implementation, vol. 7, 2006, pp. 1-14.

(56) References Cited

OTHER PUBLICATIONS

R.D. Blumofe, C.E. Leiserson, "Scheduling multithreaded computations by work stealing," pp. 356-368, 35th Annual Symposium on Foundations of Computer Science (FOCS 1994), 1994.
The Office Action for U.S. Appl. No. 12/902,404 dated Dec. 2, 2015 (26 pgs.).
The Notice of Allowance for U.S. Appl. No. 12/963,868 dated Dec. 8, 2015 (12 pgs.).
The Final Office Action for U.S. Appl. No. 12/902,404 dated Jun. 10, 2015 (51 pgs.).
The Notice of Allowance for U.S. Appl. No. 12/963,868 dated Jul. 21, 2015 (28 pgs.).
Grode, et al., "Hardware Resource Allocation for Hardware/Software Partitioning in the LYCOS System", In Proceedings of the Conference on Design, Automation and Test in Europe, Feb. 23, 1998, pp. 22-27.
The Notice on the First Office Action for Chinese Application No. 201110434003.2 dated Jan. 13, 2014 (3 pages).
"Current Status of High Performance Fortran" written by Hitoshi Murai et al. and printed in System/Control/Information published on Jan. 15, 2008 (vol. 52, No. 1, pp. 14-20, 8 pages). (This reference was cited in an Office Action from a related foreign application. A concise explanation of relevance is submitted with an English language translation of the Notice of Reasons for Rejection. (4 pages)).
"WinPC Labs GPGPU" written by Takeshi Nishi and printed in Nikkei WinPC published by Nikkei BP Publications, Inc. on Apr. 29, 2010 (vol. 16, No. 9, pp. 164-165, 3 pages). (This reference was cited in an Office Action from a related foreign application. A concise explanation of relevance is submitted with an English language translation of the Notice of Reasons for Rejection. (4 pages)).
"International Search Report and Written Opinion", dated Aug. 9, 2012, Application No. PCT/US2011/066285, Filed Date—Dec. 20, 2011, pp. 8.
Shih et al., Efficient Index Generation for Compiling Two-Level Mappings in Data-Parallel Programs, published by Journal of Parallel and distributed Computing, 2000, pp. 189-216.
The Notice of Allowance for U.S. Appl. No. 12/975,796 dated Mar. 11, 2016 (11 pgs.).
The Notice of Allowance for U.S. Appl. No. 12/975,796 dated Nov. 19, 2015 (11 pgs.).
The Notice of Allowance for U.S. Appl. No. 12/975,796 dated Jul. 22, 2015 (28 pgs.).
The Final Office Action for U.S. Appl. No. 12/975,796 dated Jan. 16, 2015 (21 pgs.).
The Office Action for U.S. Appl. No. 12/975,796 dated Jun. 19, 2014 (27 pgs.).
The Final Office Action for U.S. Appl. No. 12/975,796 dated Nov. 6, 2013 (27 pgs.).
The Office Action for U.S. Appl. No. 12/975,796 dated Mar. 19, 2013 (29 pgs.).
The Office Action for U.S. Appl. No. 15/252,192 dated Jun. 29, 2017 (44 pages).
The Office Action for U.S. Appl. No. 15/364,076 dated Dec. 21, 2017 (55 pages).
The Final Office Action for U.S. Appl. No. 15/252,192 dated Nov. 20, 2017 (20 pages).
"Office Action Issued in European Patent Application No. 11850418.2", dated Mar. 7, 2018, 4 Pages.
Bacon, et al., "Compiler Transformations for High-Performance Computing", In Journal of ACM Computing Surveys, vol. 26, Issue 4, Dec. 1994, pp. 345-420.
"Notice of Allowance Issued in Korean Patent Application No. 10-2013-7009251", dated Feb. 20, 2017, 3 Pages.
"Notice of Allowance Issued in Korean Patent Application No. 10-2013-7012441", dated Dec. 20, 2017, 3 Pages.
"Extended European Search Report Received for European Patent Application No. 11832992.9", dated Jul. 16, 2014, 7 Pages.

"Office Action Issued in European Patent Application No. 11832992.9", dated Feb. 5, 2015, 3 Pages.
"Office Action Issued in European Patent Application No. 11832992.9", dated Sep. 4, 2017, 4 Pages.
"Office Action Issued in European Patent Application No. 11840889.7", dated Mar. 2, 2018, 6 Pages.
"Search Report Issued in European Patent Application No. 11840889.7", dated Nov. 24, 2014, 11 Pages.
"Office Action Issued in European Patent Application No. 11849982.1", dated May 10, 2017, 5 Pages.
"Search Report Issued in European Patent Application No. 11849982.1", dated Feb. 25, 2016, 10 Pages.
"Office Action Issued in European Patent Application No. 11850418.2", dated Apr. 4, 2016, 3 Pages.
"Non-Final Office Action Issued in U.S. Appl. No. 15/252,192", dated Mar. 14, 2018, 24 Pages.
"Notice of Allowance Issued in Canadian Patent Application No. 2,813,879", dated Jul. 25, 2017, 1 Page.
"Office Action Issued in Canadian Patent Application No. 2,815,519", dated Jul. 13, 2017, 3 Pages.
"Office Action Issued in Canadian Patent Application No. 2,821,745", dated Nov. 22, 2017, 3 Pages.
"First Office Action and Search Report Issued in Chinese Patent Application No. 201110320247.8", dated Dec. 27, 2013, 12 Pages.
"Notice of Allowance Issued in China Patent Application No. 201110320247.8", dated Jul. 1, 2015, 4 Pages.
"Second Office Action and Search Report Issued in Chinese Patent Application No. 201110320247.8", dated Aug. 26, 2014, 10 Pages.
"Third Office Action Issued in Chinese Patent Application No. 201110320247.8", dated Feb. 4, 2015, 8 Pages.
"Notice of Allowance Issued in Chinese Patent Application No. 201110382436.8", dated Mar. 21, 2014, 6 Pages.
"Office Action Issued in Chinese Patent Application No. 201110382436.8", dated Jan. 22, 2014, 11 Pages.
"Notice of Allowance Issued in Chinese Patent Application No. 201110434003.2", dated Jun. 5, 2015, 4 pages.
"Office Action Issued in Chinese Patent Application No. 201110434003.2", dated Sep. 9, 2014, 7 Pages.
"Notice of Allowance Issued in Chinese Patent Application No. 201110439844.2", dated Jun. 5, 2014, 4 pages.
"Office Action Issued in Chinese Patent Application No. 201110439844.2", dated Dec. 16, 2013, 14 Pages.
"Notice of Allowance Issued in Japanese Patent Application No. 2013-533869", dated Jan. 11, 2017, 6 Pages.
"Office Action Issued in Japanese Patent Application No. 2013-533869", dated May 19, 2016, 4 Pages.
"Office Action Issued in Japanese Patent Application No. 2013-533869", dated Sep. 9, 2015, 5 Pages.
"Notice of Allowance Issued in Japanese Patent Application No. 2013-546346", dated Sep. 14, 2016, 4 Pages.
"Office Action Issued in Japanese Patent Application No. 2013-546346", dated Jan. 20, 2016, 7 Pages.
Chakravarty, et al., "More types for nested data parallel programming", In the Proceedings of the Fifth ACM SIGPLAN International Conference on Functional programming, ICFP '00, Jan. 1, 2000, 12 Pages.
Hinze, et al., "Type Indexed Data Types", In Proceedings of Correct System Design, Jan. 1, 2002, 28 Pages.
"International Search Report and Written Opinion Issued in PCT Application No. PCT/US11/67190", dated Jun. 1, 2012, 9 Pages.
Notice of Allowance for U.S. Appl. No. 15/364,076 dated Aug. 15, 2018 (38 pgs).
"Final Office Action Issued in U.S. Appl. No. 15/252,192", dated Sep. 21, 2018, 19 Pages.
"Office Action Issued in European Patent Application No. 118499821", dated Apr. 4, 2019, 8 Pages.
"Notice of Allowance Issued in U.S. Appl. No. 15/364,076", dated Jan. 3, 2019, 9 Pages.
"Non Final Office Action Issued in U.S. Appl. No. 15/252,192", dated Jan. 25, 2019, 19 Pages.

(56) References Cited

OTHER PUBLICATIONS

"Final Office Action Issued in U.S. Appl. No. 15/252,192", dated Jun. 20, 2019, 20 Pages.

* cited by examiner

| 0 | 1 | 2 | 3 | 4 | 5 |
|---|---|---|---|---|---|
| 6 | 7 | 8 | 9 | 10 | 11 |
| 12 | 13 | 14 | 15 | 16 | 17 |
| 18 | 19 | 20 | 21 | 22 | 23 |
| 24 | 25 | 26 | 27 | 28 | 29 |
| 30 | 31 | 32 | 33 | 34 | 35 |

14(1)

AGILE COMMUNICATION OPERATOR

CROSS-REFERENCE TO RELATED APPLICATIONS

This patent application is a continuation of Ser. No. 12/975,796 filed Dec. 22, 2010, now U.S. Pat. No. 9,395,957, entitled "AGILE COMMUNICATION OPERATOR," which is incorporated herein by reference.

BACKGROUND

Computer systems often include one or more general purpose processors (e.g., central processing units (CPUs)) and one or more specialized data parallel compute nodes (e.g., graphics processing units (GPUs) or single instruction, multiple data (SIMD) execution units in CPUs). General purpose processors generally perform general purpose processing on computer systems, and data parallel compute nodes generally perform data parallel processing (e.g., graphics processing) on computer systems. General purpose processors often have the ability to implement data parallel algorithms but do so without the optimized hardware resources found in data parallel compute nodes. As a result, general purpose processors may be far less efficient in executing data parallel algorithms than data parallel compute nodes.

Data parallel compute nodes have traditionally played a supporting role to general purpose processors in executing programs on computer systems. As the role of hardware optimized for data parallel algorithms increases due to enhancements in data parallel compute node processing capabilities, it would be desirable to enhance the ability of programmers to program data parallel compute nodes and make the programming of data parallel compute nodes easier.

Data parallel algorithms often operate on large sets of data that may be distributed across multiple computing platforms. Large sets of data provide challenges in representing and tracking the data structures that describe the data as well as in moving the data across the multiple platforms. As a result, the process of managing large sets of data across multiple computing platforms is often complex and difficult to implement.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A high level programming language provides an agile communication operator that generates a segmented computational space based on a resource map for distributing the computational space across compute nodes. The agile communication operator decomposes the computational space into segments, causes the segments to be assigned to compute nodes, and allows the user to centrally manage and automate movement of the segments between the compute nodes. The segment movement may be managed using either a full global-view representation or a local-global-view representation of the segments.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
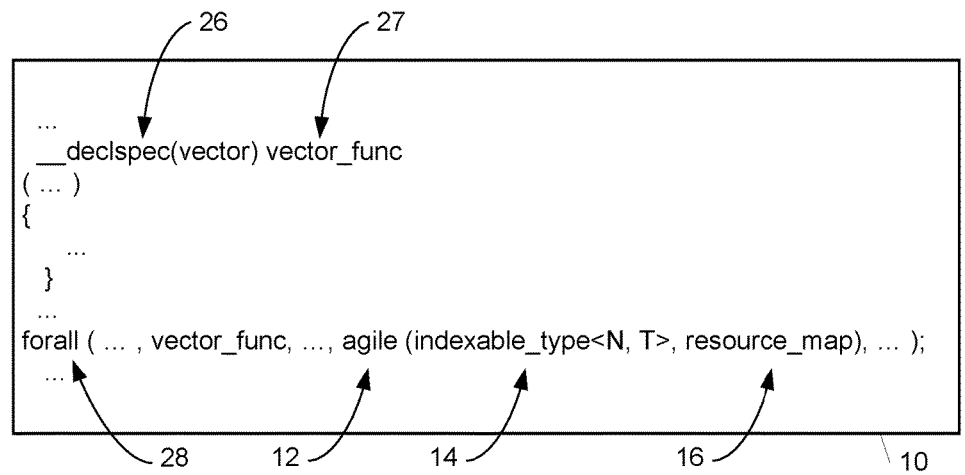
FIG. 1 is a computer code diagram illustrating an embodiment of code with an agile communication operator.

FIG. 1 is a computer code diagram illustrating an embodiment of code 10 with an agile communication operator 12. When compiled and executed, agile communication operator 12 generates a segmented computational space based on a resource map for distributing the computational space across compute nodes (e.g., compute nodes 121 shown in FIG. 4 and described in additional detail below). The agile communication operator decomposes the computational space, (represented by an input indexable type 14 in the embodiment of FIG. 1) into segments 20 of an agile indexable type 18 (also shown in the example of FIG. 3B), causes segments 20 to be assigned to compute nodes, and allows the user to centrally manage and automate movement of segments 20 between the compute nodes. The segment movement may be managed using either a full global-view representation or a local-global-view representation of the segments as described in additional detail below.

Figure 4:
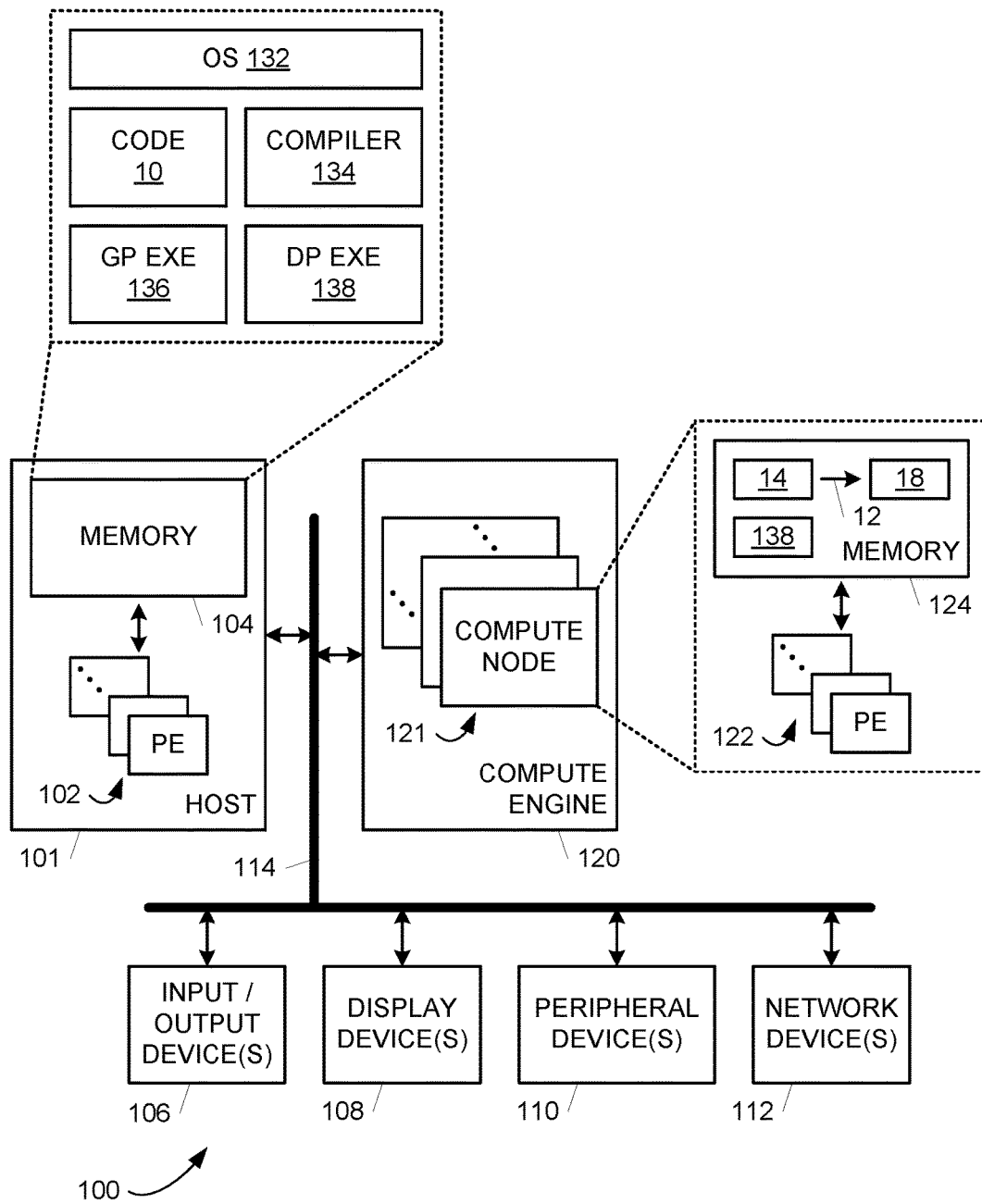
FIG. 4 is a block diagram illustrating an embodiment of a computer system configured to compile and execute data parallel code that includes an agile communication operator.

Code 10 includes a sequence of instructions from a high level general purpose or data parallel programming language that may be compiled into one or more executables (e.g., DP executable 138 shown in FIG. 4) for execution by one or more DP optimal compute nodes (e.g., DP optimal compute nodes 121 shown in FIG. 4).

In one embodiment, code 10 includes a sequence of instructions from a high level general purpose programming language with data parallel extensions (hereafter GP language) that form a program stored in a set of one or more modules. The GP language may allow the program to be written in different parts (i.e., modules) such that each module may be stored in separate files or locations accessible by the computer system. The GP language provides a single language for programming a computing environment that includes one or more general purpose processors and one or more special purpose, DP optimal compute nodes. DP optimal compute nodes are typically graphic processing units (GPUs) or SIMD units of general purpose processors but may also include the scalar or vector execution units of general purpose processors, field programmable gate arrays (FPGAs), or other suitable devices in some computing environments. Using the GP language, a programmer may include both general purpose processor and DP source code in code 10 for execution by general purpose processors and DP compute nodes, respectively, and coordinate the execution of the general purpose processor and DP source code. Code 10 may represent any suitable type of code in this embodiment, such as an application, a library function, or an operating system service.

The GP language may be formed by extending a widely adapted, high level, and general purpose programming language such as C or C++ to include data parallel features. Other examples of general purpose languages in which DP features may appear include Java™, PHP, Visual Basic, Perl, Python™, C#, Ruby, Delphi, Fortran, VB, F#, OCaml, Haskell, Erlang, NESL, Chapel, and JavaScript™. The GP language implementation may include rich linking capabilities that allow different parts of a program to be included in different modules. The data parallel features provide programming tools that take advantage of the special purpose architecture of DP optimal compute nodes to allow data parallel operations to be executed faster or more efficiently than with general purpose processors (i.e., non-DP optimal compute nodes). The GP language may also be another suitable high level general purpose programming language that allows a programmer to program for both general purpose processors and DP optimal compute nodes.

In another embodiment, code 10 includes a sequence of instructions from a high level data parallel programming language (hereafter DP language) that form a program. A DP language provides a specialized language for programming a DP optimal compute node in a computing environment with one or more DP optimal compute nodes. Using the DP language, a programmer generates DP source code in code 10 that is intended for execution on DP optimal compute nodes. The DP language provides programming tools that take advantage of the special purpose architecture of DP optimal compute nodes to allow data parallel operations to be executed faster or more efficiently than with general purpose processors. The DP language may be an existing DP programming language such as HLSL, GLSL, Cg, C, C++, NESL, Chapel, CUDA, OpenCL, Accelerator, Ct, PGI GPGPU Accelerator, CAPS GPGPU Accelerator, Brook+, CAL, APL, Fortran 90 (and higher), Data Parallel C, DAPPLE, or APL. Code 10 may represent any suitable type of DP source code in this embodiment, such as an application, a library function, or an operating system service.

Code 10 includes code portions designated for execution on a DP optimal compute node. In the embodiment of FIG. 1 where code 10 is written with a GP language, the GP language allows a programmer to designate DP source code using an annotation 26 (e.g., _declspec(vector . . . )) when defining a vector function. The annotation 26 is associated with a function name 27 (e.g., vector_func) of the vector function that is intended for execution on a DP optimal compute node. Code 10 may also include one or more invocations 28 of a vector function (e.g., forall . . . , vector_func, . . . ) at a call site (e.g., forall, reduce, scan, or sort). A vector function corresponding to a call site is referred to as a kernel function. A kernel function may call other vector functions in code 10 (i.e., other DP source code) and may be viewed as the root of a vector function call graph. A kernel function may also use types (e.g., classes or structs) defined by code 10. The types may or may not be annotated as DP source code. In other embodiments, other suitable programming language constructs may be used to designate portions of code 10 as DP source code and/or general purpose processor code. In addition, annotations 26 may be omitted in embodiments where code 10 is written in a DP language.

Figure 2:
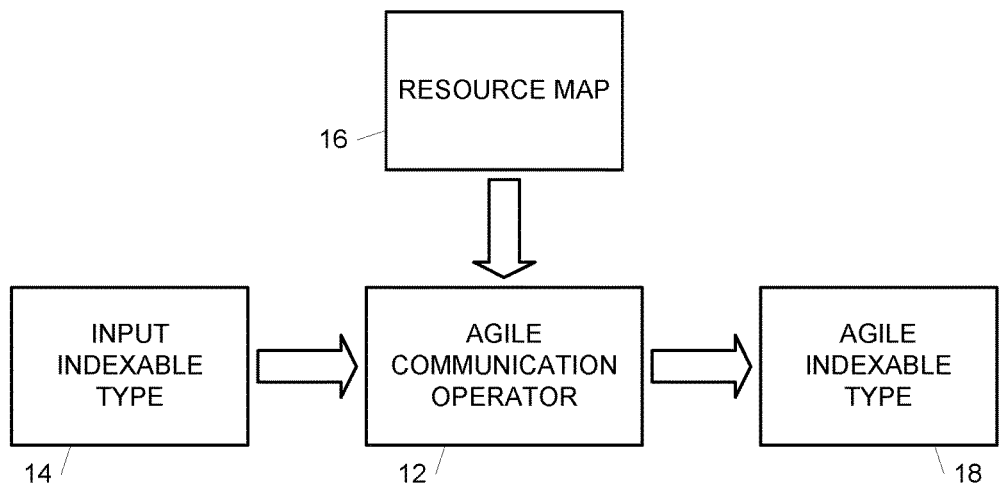
FIG. 2 is a block diagram illustrating an embodiment of applying an agile communication operator to an input indexable type.

FIG. 2 is a block diagram illustrating an embodiment of applying agile communication operator 12 to an input indexable type 14 to produce an agile indexable type 18. As used herein, an indexable type is any data type that implements one or more subscript operators along with a rank, which is a non-negative integer, and a type which is denoted element_type. If index<N> is a type that represents N-tuples of integers (viz., any type of integral data type), an instance of index<N> is a set of N integers {i0, i1, . . . , im} where m is equal to N−1 (i.e., an N-tuple). An index operator of rank N takes an N-tuple instance of index<N> and associates the instance with another instance of a type called the element type where the element type defines each element in an indexable type. In one embodiment, an indexable type defines one or more of the following operators:

```
element_type operator[ ] (index_declarator);
const element_type operator[ ] (index_declarator)
const;
    element_type& operator[ ] (index_declarator);
    const element_type& operator[ ] (index_declarator)
const;
    element_type&& operator[ ] (index_declarator); or
    const element_type&& operator[ ] (index_declarator)
const;
    where index_declarator takes the form of at least one
of:
    const index<rank>& idx;
    const index<rank> idx;
    index<rank>& idx;
    index<rank> idx.
```

In other embodiments the operators may be functions, functors or a more general representation. An indexable type's shape is the set of index<rank> for which one of the above subscript operators is defined. An indexable type typically has a shape that is a polytope—i.e., an indexable type may be algebraically represented as the intersection of a finite number of half-spaces formed by linear functions of the coordinate axes.

With reference to FIGS. 1 and 2, the high level language of code 10 provides agile communication operator 12 for use on input indexable type 14 in a data parallel computing environment in one embodiment. Input indexable type 14 has a rank (e.g., rank N in the embodiment of FIG. 1) and element type (e.g., element type T in the embodiment of FIG. 1) and defines the computational space that is operated on by agile communication operator 12. Agile communication operator 12 receives input indexable type 14 and a resource map 16 (e.g., resource_map in the example of FIG. 1). From input indexable type 14 and resource map 16, agile communication operator 12 generates an agile indexable type 18 with segments 20, also referred to as sub-grids, specified by resource map 16 (also shown in the example of FIG. 3B). As shown in code 10, agile communication operator 12 may be used to pass agile indexable type 18 to a DP call site (i.e., forall in the example of FIG. 1). By doing so, agile communication operator 12 causes the vector function specified by the call site to be replicated on all compute nodes (e.g., compute nodes 121 shown in FIG. 4) with each compute node receiving the segments 20 assigned to the compute node.

Agile communication operator 12 causes input indexable type 14 to be decomposed into segments 20 and assigns each segment 20 to a compute node as specified by resource map 16. Resource map 16 provides a specification of where memory, i.e., input indexable type 14, is stored across at least one compute node. Resource map 16 specifies segments 20 such that the collection of segments 20 covers agile indexable type 18 without overlap. Resource map 16 allows segments 20 to be specified with the same or different block sizes and/or regular or irregular block combinations.

Figures 3A, 3B, 3C:
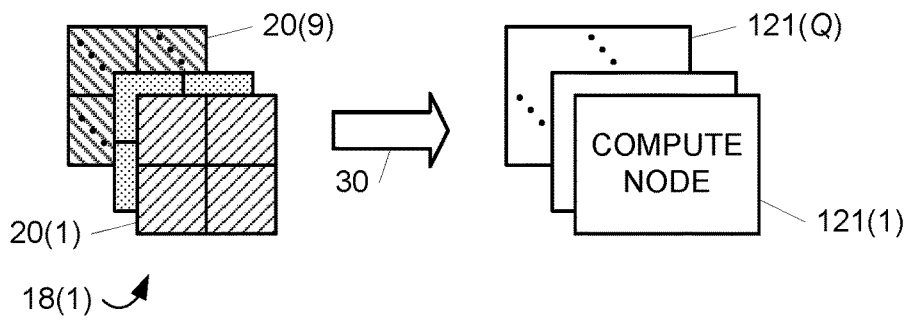
FIGS. 3A-3C is are block diagrams illustrating examples of generating and using an agile indexable type.

FIGS. 3A-3C is are block diagrams illustrating examples of generating and using an agile indexable type 18(1). In the example of FIGS. 3A-3C, agile communication operator 12 partitions a 6x6 matrix with elements numbered 0 to 35 (i.e., an input indexable type 14(1)) into nine segments 20 in agile indexable type 18(1) shown in FIG. 3B as specified by a corresponding resource map 16 (shown in FIG. 2). Each segment 20 is represented by a different shading in FIG. 3B. For example, a first segment 20(1) includes elements 0, 1, 6, and 7, a second segment 20(2) includes elements 2, 3, 8, and 9, etc. Agile communication operator 12 also causes segments 20(1)-20(9) to be assigned to a set of one or more compute nodes 121(1)-121(Q), where Q is an integer that is greater than or equal to one, as specified by a protocol in resource map 16 and indicated by an arrow 30 in FIG. 3C.

Resource map 18 may incorporate any suitable assignment protocol such as a block decomposition, a cyclic decomposition, a block-block decomposition, or a block-cyclic decomposition. The following protocol examples assume that there are three compute nodes 121(1)-121(3) (i.e., Q=3) or four compute nodes 121(1)-121(4) (i.e., Q=4) and that segments 20 are numbered 20(1)-20(9) in across rows from left to right starting from the first (i.e., the top) row.

With row block decomposition and Q=3, the thirty-six elements of input indexable type 14(1) are divided by three such that each compute node 121 is assigned twelve elements. Thus, resource map 18 causes elements 0 to 11 (i.e., segments 20(1)-20(3)) to be assigned to compute node 121(1), elements 12 to 23 (i.e., segments 20(4)-20(6)) to be assigned to compute node 121(2), and elements 24 to 35 (i.e., segments 20(7)-20(9)) to be assigned to compute node 121(3).

With row block decomposition and Q=4, the thirty-six elements of input indexable type 14(1) are divided by four such that each compute node 121 is assigned nine elements. Accordingly, resource map 18 causes elements 0 to 8 to be assigned to compute node 121(1), elements 9 to 17 to be assigned to compute node 121(2), elements 18 to 26 to be assigned to compute node 121(3), and elements 27 to 36 to be assigned to compute node 121(4).

With column block decomposition and Q=3, resource map 18 causes the first and second columns of segments 20 (i.e., segments 20(1), 20(4), and 20(7)) to be assigned to compute node 121(1), the third and fourth columns of segments 20 (i.e., segments 20(2), 20(5), and 20(8)) to be assigned to compute node 121(2), and the fifth and sixth columns of segments 20 (i.e., segments 20(3), 20(6), and 20(9)) to be assigned to compute node 121(3).

With row cyclic decomposition and Q=3, resource map 18 causes elements (3*k), for k=0 to 11, to be assigned to compute node 121(1), elements (3*k+1) to be assigned to compute node 121(2), and elements (3*k+2) to be assigned to compute node 121(3).

With row cyclic decomposition and Q=4, resource map 18 causes elements (4*k), for k=0 to 8, to be assigned to compute node 121(1), elements (4*k+1) to be assigned to compute node 121(2), elements (4*k+2) to be assigned to compute node 121(3), and elements (4*k+3) to be assigned to compute node 121(4).

With row block-cyclic decomposition and Q=3, decomposition is the cyclic decomposition on segments 20(1)-20(9) shown in FIG. 3B. Accordingly, resource map 18 causes segments 20(1), 20(4), and 20(7) to be assigned to compute node 121(1), segments 20(2), 20(5), and 20(8) to be assigned to compute node 121(2), and segments 20(3), 20(6), and 20(9) to be assigned to compute node 121(3).

With row block-cyclic decomposition and Q=4, resource map 18 causes segments 20(1), 20(5), and 20(9) to be assigned to compute node 121(1), segments 20(2) and 20(6) to be assigned to compute node 121(2), segments 20(3) and 20(7) to be assigned to compute node 121(3), and segments 20(4) and 20(8) to be assigned to compute node 121(4).

With row block-block decomposition and Q=3, resource map 18 causes segments 20(1)-20(3) to be assigned to compute node 121(1), segments 20(4)-20(6) to be assigned to compute node 121(2), and segments 20(7)-20(9) to be assigned to compute node 121(3).

The row or column decomposition decision for resource map 16 may depend upon memory layout. For example, column-major memory layout may imply column decomposition using a suitable protocol.

In one embodiment, resource map 16 includes a collection of resource segments where each resource segment associates a segment 20 with a resource view (i.e., an abstraction of a compute node) (not shown). For example, for an indexable type 14 defined by:
 grid<rank> parent_grid;
where grid<rank> contain two data members:
 extent<rank> _M_extent;
 index<rank> _M_offset;
For example, the second segment 20(2) in FIG. 3B, the shape or grid has _M_extent={2,2} and _M_offset={0,1}, and the sixth segment 20(6) has _M_extent={2,2} and _M_offset={1,2}. Accordingly, parent_grid may be decomposed using:
 grid<rank> algorithmic_blocks[M1];
 grid<rank> memory_blocks[M2];
 grid<rank> compute_nodes[M3];
where M1, M2, M3>0 and M1>=M2>=M3. Typically, M3 divides M2 and M2 divides M1. All three of algorithmic_blocks, memory_blocks and compute_nodes cover parent_grid with no overlap. algorithmic_blocks represents decomposition used in the algorithm being implemented. memory_blocks represents the granularity in which memory is moved between nodes, when necessary. Compute_nodes represents the granularity at which compute nodes are assigned to store the corresponding data.

It is assumed there are associations so that every algorithmic_block or memory_block can look up where it is stored on a compute_node and so that each algorithmic_block can look up where it is stored on a memory_block.

A class called resource_map may be generated with resource_segments that form an association between a child grid and a resource_view:

```
template <int rank>
struct resource_segment {
  int _M_id;
  grid<rank> _M_child; // representing compute_nodes[k] for some k
  resource_view _M_resource_view;
};
```

Using agile communication operator 12, data of an agile indexable type 18 may be accessed seamlessly without the user having knowledge of the compute node where the data is currently residing. For an example indexable type 14, A, with shape parent_grid, the storage of A is determined by the instances of resource_segment. To access an element of A at:
  index<rank> _Index;
the child-grid that contains Index is first found, then an offset:
  index<rank> _Offset;
is determined such that:

_Index=child-grid-offset+_Offset.

With the resource_segment notation the relationship is:
  _Index=_Resource_segment._M_child._M_offset+_Offset.

In order to increase the speed of lookups, the following check is performed to determine whether _Index (as _Index varies) still belongs to _Resource_segment._M_child:

```
        index<rank> _Local_offset =
        _Index - _Resource_segment._M_child._M_offset;
        extent<rank> _Local_bounds =
        _Resource_segment._M_child._M_extent;
        if ( _Local_offset < _Local_bounds ) {
                // access data wrt machine _M_resource_view
                ... local array[ _Local_offset ] ...
        }
```

The determination of the child grid or _Resource_segment that a given Index belongs to depends on the decomposition pattern. At worst-case a binary search in every dimension may be used but may not be avoided. However with a 2048×2048 tile decomposition where all tiles have equal extent, for example, find the Resource_segment with _M_child._M_offset equal to:
  index<2>_Tile(2048,2048);
  (_Index+_Tile−1)/_Tile.
That _Resource_segment (i.e., the current resource_segment) may be used until:
if (_Local_offset<_Local_bounds) { . . . }
is violated, in which case divide a new _Index by _Tile again and repeat. This mechanism may be optimal for algorithms that have locality where new containing resource_segments only need to be found infrequently.

In the local-global-view representation described below, the user index operators may omit the if-check (referred to herein as bounds checking):
  if (_Local_offset<_Local_bounds) { . . . }
because the user is trusted to be within bounds upon every access. If a given resource_segment is exhausted and another will be used, the user is trusted to call a function that resets the current resource_segment. In the simplest form of local-global-view, all three decompositions:
  grid<rank> algorithmic_blocks[M1];
  grid<rank> memory_blocks[M2];
  grid<rank> compute_nodes[M3];
are regular with the same sized blocks or tiles. A tile communication operator that partitions an indexable type into tiles may be applied to the first decomposition to yield:
  algorithmic_tiles
An individual tile is:
  algorithmic_tiles(tile_index).
When owner copy is initiated on:
  algorithmic_tiles(_tile_index)
the containing memory_blocks[k1] and compute_nodes[k2] are determined. The owner compute_nodes[k3] is determined next, and then memory_blocks[k1] is moved from compute_nodes[k2] to compute_nodes[k3].

Automatic memory movement granularity is often at a finer granularity than the sub-grid decomposition of segments 20. For example, suppose the matrix of FIG. 3A represents a 6144×6144 element matrix, viz., each numbered algorithmic block represents 1024×1024 data elements. Assume that the 6144×6144 matrix is decomposed into 2048×2048 compute_nodes blocks, such as in FIG. 3B. In addition, assume that Q=4 and the compute nodes 121(1), 121(2), 121(3), and 121(4) are assigned to the 2048×2048 blocks (viz., segments 20(1)-20(9)) according to the block-cyclic decomposition. Then segments 20(1), 20(5), 20(9) are assigned to compute node 121(1), segments 20(2), 20(6) are assigned to compute node 121(2), segments 20(3) and 20(7) are assigned to compute node 121(3), and segments 20(4) and 20(8) are assigned to compute node 121(4). Memory may be moved in 1024×1024 blocks in this example. Accordingly, if a computation seeks to move a single data element from a 1024×1024 block, the whole 1024×1024 block is moved.

Agile communication operator 12 allows data parallel (DP) algorithms to be coded with a full global-view representation or a local-global-view representation of segments 20 of agile indexable type 18 to manage the movement of segments 20 between compute nodes.

The full global-view representation allows DP algorithms to be coded as if they were going to be run on a single compute node with automatic owner-copy memory movement happening behind the scenes. As an example with matrix addition, assume that A, B and C are each 6144×6144 matrices as shown in FIG. 3A where each numbered block represents 1024×1024 data elements. A and B carry valid data, but C is allocated but not necessarily carrying any data. Further assume that A, B and C are each allocated on compute nodes 121(1)-121(Q) where Q is equal to 4 in this case and where segments 20(1)-20(9) of each of A, B, and C are stored on compute nodes 121(1)-121(Q), respectively. With the following computation:

$C=A+B$: where $C(i,j)=A(i,j)+B(i,j)$: $0<=i,j<6$ each (i,j) represents 1024×1024 elements.

Owner copy means that data is moved, if necessary, to the compute node 121 where the answer, i.e., C, is being computed. In this example, blocks of A and B are moved to compute nodes 121 where corresponding blocks of C are stored as the computation dictates. For simple matrix addition, however, no movement is needed because the blocks of A and B are stored on the same compute nodes 121 as the corresponding blocks of C. The computation;

$C(1,2)=A(1,2)+B(1,2)$ uses block 8 in FIG. 3B for each of A, B and C. Block 8 is part of segment 20(2) which is stored on compute node 121(2) for each of A, B and C, so no data movement occurs.

Similarly, the following computations occur on the corresponding segments 20 and compute nodes 121:

$C(0,0)=A(0,0)+B(0,0)$ on segment 20(1), compute node 121(1)

$C(1,0)=A(1,0)+B(1,0)$ on segment 20(1), compute node 121(1)

$C(2,0)=A(2,0)+B(2,0)$ on segment 20(4), compute node 121(4)

$C(3,0)=A(3,0)+B(3,0)$ on segment 20(4), compute node 121(4)

$C(4,0)=A(4,0)+B(4,0)$ on segment 20(7), compute node 121(3)

$C(5,0)=A(5,0)+B(5,0)$ on segment 20(7), compute node 121(3)

Here a segment refers to one element of the decomposition:
grid<2> compute_nodes[9].
In fact:
grid<2> algorithmic_blocks[36];
grid<2> memory_blocks[18];
grid<2> compute_nodes[9];
where the algorithmic_blocks have extent 1024×1024, the memory_blocks have extent 2048×1024, and the compute_nodes have extent 2048×2048. Thus, matrix addition is a fairly elementary example.

In another example with the above assumptions, the transpose of B is added to A to generate C as follows:

$C=A+B^T$: where $C(i,j)=A(i,j)+B(j,i)^T$: $0<=i,j<6$ where each (i,j) represents 1024×1024 elements and $B(j,i)^T$ is the transpose of the underlying 1024×1024 block.

In this case, B(j, i) is moved over to the compute node 121 where C(i,j) (and A(i,j)) is stored for all blocks except for those in segments 20(1), 20(5), and 20(9). For example, the blocks of segment 20(1) do not have to be moved because the computation for the blocks of segment 20(1) of C is:

$C(0,0)=A(0,0)+B(0,0)^T$ $C(0,1)=A(0,1)+B(1,0)^T//B(1,0)^T$ is in segment 20(1) of B $C(1,0)=A(1,0)+B(0,1)^T//B(0,1)^T$ is in segment 20(1) of B $C(1,1)=A(1,1)+B(1,1)^T$ However, for the blocks of segment 20(4) of C:

$C(2,0)=A(2,0)+B(0,2)T$ $C(2,1)=A(2,1)+B(1,2)T$ $C(3,0)=A(3,0)+B(0,3)T$ $C(3,1)=A(3,1)+B(1,3)T$ the B blocks are from the blocks of segment 20(2) stored on compute node 121(2) and the C blocks are from the blocks of segment 20(4) stored on compute node 121(4). Accordingly, the 1024×1024 elements of block 2 of B (i.e., $B(0,2)^T$) are moved to compute node 121(4), added to A(2,0), and assigned to C(2,0), the 1024×1024 elements of block 8 of B (i.e., $B(1,2)^T$) are moved to compute node 121(4), added to A(2,1), and assigned to C(2,1), the 1024×1024 elements of block 3 of B (i.e., $B(0,3)^T$) are moved to compute node 121(4), added to A(3,0) and assigned to C(3,0), and the 1024×1024 elements of block 9 of B (i.e., $B(1,3)^T$) are moved to compute node 121(4), added to A(3,1) and assigned to C(3,1).

With the full global-view representation, the memory movements are done automatically because each block carries the information of which compute node 121 stores the block. The computations may be directed from any of compute nodes 121 or a host, such as host 101 shown in FIG. 4 and described in additional detail below.

In other variations of the example above, multiple segments 20 may be assigned to the same compute node 121 where the number of compute nodes 121 are less than the number of segments 20. In addition, the processing capabilities of the compute nodes 121 may be weighted such that faster compute nodes 121 may be assigned more segments 20 than slower compute nodes 121. The assignments may be performed according to one or more the protocols described above.

Automatic load balancing using work-stealing may also be implemented in variations of the above. When a compute node 121 completes its computations, the compute node 121 attempts to steal computations assigned to other nodes 121. The compute node 121, or possibly host, that directs the computations may store work-stealing queues of work-items where the queues contain tasks that represent the computation of memory-movement-granularity (e.g., 1024×1024) on the owner matrix (e.g., C).

With A, B, and C from above matrix addition with B transpose example with four equally-weighted compute nodes 121(1)-121(4) and a block-cyclic decomposition protocol, the following four work-stealing queues may be stored as follows.

So with the above picture and $C=A+B^T$ and memory-movement-granularity=1024×1024 and 4 machines equally weighted (w0=w1=w2=w3=1) and block-cyclic decomposition:

queue0 consist of 12 tasks—the four 1024×1024 blocks each of segments 20(1), 20(5), and 20(9);
queue1 consist of 8 tasks—the four 1024×1024 blocks each of segments 20(2) and 20(6);
queue2 consist of 8 tasks—the four 1024×1024 blocks each of segments 20(3) and 20(7);
queue3 consist of 8 tasks—the four 1024×1024 blocks each of segments 20(4) and 20(8).

For example, queue2 includes the tasks:

$C(0,4)=A(0,4)+B(4,0)T$ $C(0,5)=A(0,5)+B(5,0)T$ $C(1,4)=A(1,4)+B(4,1)T$ $C(1,5)=A(1,5)+B(5,1)T$ $C(4,0)=A(4,0)+B(0,4)T$ $C(4,1)=A(4,1)+B(1,4)T$ $C(5,0)=A(5,0)+B(0,5)T$ $C(5,1)=A(5,1)+B(1,5)T$

Each compute node 121 takes a task from the top of its corresponding work-stealing queue until all tasks from the work-stealing queue are completed. When the work-stealing queue of a compute node 121 is empty, the compute node 121 steals a task from the bottom of a work-stealing queue that corresponds to another compute node 121. Local-global-view is typically enabled through the tile communication operator at the algorithmic_blocks level of granularity. Assuming a regular tile decomposition, the tile communication operator is applied to the first to yield:
  algorithmic_tiles
An individual tile is:
  algorithmic_tiles(_tile_index).
When owner copy is initiated on:
  algorithmic_tiles(_tile_index) the containing memory_blocks[k1] and compute_nodes[k2] are determined. The owner compute_nodes[k3] is determined next, and then memory_blocks[k1] is moved from compute_nodes[k2] to compute_nodes[k3]. This is all done at the level of accessing algorithmic_tiles(_tile_index). When implementing the algorithm, an element (or, recursively, a finer block) is accessed as:
  algorithmic_tiles(_tile_index)(_local_index)

In contrast with the full global-view representation, the local-global-view representation allows memory movement to be explicitly specified by the user. In the above full global-view representation examples, the memory movement granularity was 1024×1024 blocks such that the entire 1024×1024 block was moved to a compute node 121 if the compute node 121 accessed a single element in the block.

In some computations, the granularity of the computation is finer than the memory movement granularity and the local-global-view representation provides advantages over the user explicitly directing where every memory block is to be moved. For example, assume that the memory movement granularity is 2048×1024 in the full global-view representation examples, viz., two blocks are moved whenever an element is moved from either of the two blocks. So for $C=A+B^T$, the compute for blocks of segment 20(4) of C are:

$$C(2,0)=A(2,0)+B(0,2)^T$$

$$C(2,1)=A(2,1)+B(1,2)^T$$

$$C(3,0)=A(3,0)+B(0,3)^T$$

$$C(3,1)=A(3,1)+B(1,3)^T$$

In each case, the B blocks are stored on compute node 121(2) and the C and A blocks (C is the owner) are stored on compute node 121(4). Thus, the first two of the above statements are carried out by explicitly directing any element of block 2 of B (i.e., $B(0,2)^T$) to be moved to compute node 121(4). Because of the 2048×1024 memory granularity, both blocks 2 and 8 of B (i.e., $B(0,2)^T$ and $B(1,2)^T$) are moved to compute node 121(4) to allow the additions of the first two statements to be performed by compute node 121(4). Likewise, the last two of the above statements are carried out by explicitly directing any element of block 3 of B (i.e., $B(0,3)^T$) to be moved to compute node 121(4). Because of the 2048×1024 memory granularity, both blocks 3 and 9 of B (i.e., $B(0,3)^T$ and $(1,3)^T$) are moved to compute node 121(4) to allow the additions of the last two statements to be performed by compute node 121(4).

As these examples show, the granularity of the computation may be finer than the memory movement granularity, which may be finer than the compute node granularity, so that there may be many tasks executing on a given memory movement block with one or more algorithms. A single directive to move an element of a block allows the tasks operating on the block to be more efficiently executed. Both the user and the implementation may omit checking to see whether memory needs to be moved until the directing algorithm begins working on another memory movement block, and, as seen above, the tile communication operator corresponding to the algorithmic_blocks decomposition actually directs the memory movement when necessary. If a 1024×1024 tile (e.g. block 3) is to be moved, then the containing 2048×1024 memory movement block (e.g. mem-movement block 3) is moved from the containing 2048×2048 compute node block (e.g., segment 20(2)) to the owner-copy determined 2048×2048 block (e.g., segment 20(4)). If block 9 now is to be moved, accessing the corresponding tile will look up its containing memory-movement block and determine that it has already been moved to segment 20(4), so no movement is necessary. Bounds checking as set forth above may be omitted because the correct memory movement has occurred at the tile level before the actual data element access in the tile. That is to say:
  algorithmic_tiles(_tile_index).
generates any necessary memory movement, then:
  algorithmic_tiles(_tile_index)(_local_index) can be accessed without bounds checking each local index. For example, in the above computation, there are two algorithmic tasks for each memory movement block.

In practice, all computation performed on a given memory block on the owner memory (e.g., C) may be grouped into a large task and the first statement in the task may be a single memory movement directive. The directive may be in the form of a standard C++ annotation on the task as follows in one embodiment.
[[move_memory(C, B)]]
void kernel(field<2, double>& C, const field<2, double>& A, const field<2, double>& B);

Using this annotation, a compiler may optimize and interleave memory movement and computation.

The following code provides an overview of an implementation of agile communications operator 12 in one embodiment.

```
//
// A resource_view is a handle for a physical compute engine.
// The only hard requirement is a memory hierarchy
in which to realize data.
// The fundamental property of resource_view is _Buffer<T>, which is
// essentially a concrete 1-dimensional array of type T.
//
struct resource_view;
//
// Given an allocation of memory with a structure to represent
it as a _Rank-dimenional
// array (viz., field, cf. infra), construct a partioning or segmentation
of it. The allocation of memory has
// indices as integral points in a rectangular set with offset,
as described by a grid (cf. infra).
//
template <int _Rank>
struct index {
  // overloaded subscript and ctors
  int m_base[_Rank];
};
template <int _Rank>
struct extent {
  // overloaded function-call, subscript and ctors
  unsigned int _M_base[_Rank];
};
template <int _Rank>
struct grid {
  static_assert(_Rank > 0, "rank must be > 0");
  unsigned int total_extent( ) const {
    unsigned int total_extent = _M_extent[0];
    for (int i = 1; i < _Rank; ++i)
      total_extent *= _M_extent[i];
    return total_extent;
  }
```

```
        // various overloads
        extent<_Rank> _M_extent;
        index<_Rank> _M_offset.
};
//
// Here is the fundamental data type of DPC++.
// Various indexable types inherit from fields or other
// indexable types. Each indexable types just gives a
// different view of its parent (viz., base class) and the data
// does not physically change. The overloaded subscript
// operator represents the different view. For example, the transpose
// indexable type would have subscript operator in _Rank=2:
//
// template <typename _Parent_type>
// struct transpose_range : public _Parent_type {
//     element_type& operator[ ] (const index<2>& _Index) {
//         _Parent_type& base = *static_cast<_Parent_type*>(this);
//         return (*this)[index<2>(_Index[1], _Index[0]);
//     }
// };
//
template <int _Rank, typename _Element_type>
struct field {
    // basic indexable type characteristics
    const static int rank = _Rank;
    typedef _Element_type element_type;
    //
    // Construct _M_multiplier so that it maps _Rank-dimensional =>
    1-dimensional.
    //
    field(const extent<_Rank>& _Extent, const
    resource_view& _Resource_view)
        : _M_grid(_Extent), _M_store(_Buffer<_Element_type>
        (_Grid.total_extent( )))
    {
        // create a row-major multiplier vector
        _M_multiplier[0] = 1;
        if (_Rank > 1)
            _M_multiplier[1] = _M_grid[0];
        if (_Rank > 2)
            for (int i = 2; i < _Rank; ++i)
                _M_multiplier[i] = _M_grid[i-1]*_M_multiplier[i-1];
    }
    //
    // Construct a subfield from another
    //
    template <typename _Other>
    field(const grid<_Rank>& _Grid, const _Other& _Parent)
        : _M_grid(_Grid), _M_store(_Parent.get_store( )),
    _M_multiplier(_Parent.get_multiplier( )) {
    }
    //
    // Checking that _Index is within _M_grid, is elided for now.
    //
    element_type& operator[ ] (const index<_Rank>& _Index) {
        return _Buffer[ flatten(_Index) ];
    }
private:
    grid< _Rank> _M_grid;
    extent<_Rank> _M_multiplier;
    _Buffer<_Element_type> m_store;
    //
    // Map _Rank-dimensional => 1-dimensional.
    //
    unsigned int flatten(const index<_Rank>& _Index) {
        unsigned int _Flat_index = _Index[0];
        if (_Rank > 1)
            _Flat_index += _Index[1]*_M_multiplier[1];
        if (_Rank > 2)
            for (int i = 2; i < _Rank; ++i)
                _Flat_index += _Index[i]*_M_multiplier[i];
        return _Flat_index;
    }
};
//
// Given a grid, define grid_segment to represent a
single segment in the segmentation.
//
//
// _M_parent is the grid being segmented (viz., partitioned).
// _M_child describes the extent and offset of the owned grid
segment which must be within parent.
// _M_id is an identifier for this grid_segment.
//
template <int _Rank>
struct grid_segment {
    int _M_id;
    grid<_Rank> _M_child;
    grid<_Rank> _M_parent;
};
//
// resource_segment associates a grid_segment with a resource_view
//
template <int _Rank>
struct resource_segment {
    grid_segment<_Rank> _M_segment;
    resource_view _M_resource_view;
};
//
// resource_map is a collection of resource segments
covering a parent grid.
// resource_map is not marshaled to a device.
// It is a structure that either completely resides on a single
compute node or a host.
// resource_map can be specialized for block, cyclic and block-cyclic
decompositions,
// as well as sparse, strided, associative, and unstructured.
//
template <int _Rank>
struct resource_map {
    //
    // Create a resource_map by specifying the split points
    and parent grid.
    // The ith slot of every split point in _Split_points that
    is != -1, determines the
    // partition points on the ith axis. Let the number of such
    points be N(i).
    // Then there are N(0)*N(1)*...*N(_Rank - 1) resource segments.
    //
    // For example, rank=2,
    // parent_grid._M_extent={36,36},
    // _Split_points[0] = {16},
    // _Split_points[1] = {16}, then there are 4 = (1+1)*(1+1)
    segments of extent {16,
16}.
    //
    // This specifies the compute_nodes
    // decomposition. There are also methods/ctors that
    // allow the specification of memory_blocks
    // and algorithmic blocks.
    //
    // The resource_map provides the mechanism for
    // both every data element and every algorithmic
    // tile to determine the containing memory movement
    // block and the containing resource_segment.
    // This is enough for an agile field to determine when
    // to move memory and when to just access for free
    // (local-global-view). Or for global-view, enough
    // information for every data element to find the
    // containing resource_segment whenever the
    // if-check set forth above (i.e., bounds checking) is violated.
    //
    //
// Now create an agile indexable type
//
template <typename _Parent_type>
struct agile_range : public _Parent_type {
    const static int rank = _Parent_type::rank;
    typedef typename _Parent_type::element_type element_type;
    agile_range(const _Parent_type& _Parent, const
    resource_map<rank>&
    _Resource_map)
        : _Parent_type(_Parent), _M_resource_map(_Resource_map) {
    }
private:
    resource_map<rank> _M_resource_map;
};
```

```
//
// agile communications operator 12 is the standard way to
change resource view,
usually to multiple resource views.
//
template <typename _Parent_type>
agile_range<_Parent_type>agile(const _Parent_type& _Parent, const
resource_map<rank>& _Resource_map) {
    return agile_range<_Parent_type>(_Parent, _Resource_map);
}
```

FIG. 4 is a block diagram illustrating an embodiment of a computer system 100 configured to compile and execute data parallel code 10 that includes an agile communication operator 12.

Computer system 100 includes a host 101 with one or more processing elements (PEs) 102 housed in one or more processor packages (not shown) and a memory system 104. Computer system 100 also includes zero or more input/output devices 106, zero or more display devices 108, zero or more peripheral devices 110, and zero or more network devices 112. Computer system 100 further includes a compute engine 120 with one or more DP optimal compute nodes 121 where each DP optimal compute node 121 includes a set of one or more processing elements (PEs) 122 and a memory 124 that stores DP executable 138.

Host 101, input/output devices 106, display devices 108, peripheral devices 110, network devices 112, and compute engine 120 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a smart phone, a personal digital assistant (PDA), a mobile telephone, and an audio/video device. The components of computer system 100 (i.e., host 101, input/output devices 106, display devices 108, peripheral devices 110, network devices 112, interconnections 114, and compute engine 120) may be contained in a common housing (not shown) or in any suitable number of separate housings (not shown).

Processing elements 102 each form execution hardware configured to execute instructions (i.e., software) stored in memory system 104. The processing elements 102 in each processor package may have the same or different architectures and/or instruction sets. For example, the processing elements 102 may include any combination of in-order execution elements, superscalar execution elements, and data parallel execution elements (e.g., GPU execution elements). Each processing element 102 is configured to access and execute instructions stored in memory system 104. The instructions may include a basic input output system (BIOS) or firmware (not shown), an operating system (OS) 132, code 10, compiler 134, GP executable 136, and DP executable 138. Each processing element 102 may execute the instructions in conjunction with or in response to information received from input/output devices 106, display devices 108, peripheral devices 110, network devices 112, and/or compute engine 120.

Host 101 boots and executes OS 132. OS 132 includes instructions executable by the processing elements to manage the components of computer system 100 and provide a set of functions that allow programs to access and use the components. In one embodiment, OS 132 is the Windows operating system. In other embodiments, OS 132 is another operating system suitable for use with computer system 100.

When computer system executes compiler 134 to compile code 10, compiler 134 generates one or more executables— e.g., one or more GP executables 136 and one or more DP executables 138. In other embodiments, compiler 134 may generate one or more GP executables 136 to each include one or more DP executables 138 or may generate one or more DP executables 138 without generating any GP executables 136. GP executables 136 and/or DP executables 138 are generated in response to an invocation of compiler 134 with data parallel extensions to compile all or selected portions of code 10. The invocation may be generated by a programmer or other user of computer system 100, other code in computer system 100, or other code in another computer system (not shown), for example.

GP executable 136 represents a program intended for execution on one or more general purpose processing elements 102 (e.g., central processing units (CPUs)). GP executable 136 includes low level instructions from an instruction set of one or more general purpose processing elements 102.

DP executable 138 represents a data parallel program or algorithm (e.g., a shader) that is intended and optimized for execution on one or more data parallel (DP) optimal compute nodes 121. In one embodiment, DP executable 138 includes DP byte code or some other intermediate representation (IL) that is converted to low level instructions from an instruction set of a DP optimal compute node 121 using a device driver (not shown) prior to being executed on the DP optimal compute node 121. In other embodiments, DP executable 138 includes low level instructions from an instruction set of one or more DP optimal compute nodes 121 where the low level instructions were inserted by compiler 134. Accordingly, GP executable 136 is directly executable by one or more general purpose processors (e.g., CPUs), and DP executable 138 is either directly executable by one or more DP optimal compute nodes 121 or executable by one or more DP optimal compute nodes 121 subsequent to being converted to the low level instructions of the DP optimal compute node 121.

Computer system 100 may execute GP executable 136 using one or more processing elements 102, and computer system 100 may execute DP executable 138 using one or more PEs 122 as described in additional detail below.

Memory system 104 includes any suitable type, number, and configuration of volatile or non-volatile storage devices configured to store instructions and data. The storage devices of memory system 104 represent computer readable storage media that store computer-executable instructions (i.e., software) including OS 132, code 10, compiler 134, GP executable 136, and DP executable 138. The instructions are executable by computer system 100 to perform the functions and methods of OS 132, code 10, compiler 134, GP executable 136, and DP executable 138 as described herein. Memory system 104 stores instructions and data received from processing elements 102, input/output devices 106, display devices 108, peripheral devices 110, network devices 112, and compute engine 120. Memory system 104 provides stored instructions and data to processing elements 102, input/output devices 106, display devices 108, peripheral devices 110, network devices 112, and compute engine 120. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Compute engine 120 is configured to execute DP executable 138. Compute engine 120 includes one or more compute nodes 121. Each compute node 121 is a collection of computational resources that share a memory hierarchy. Each compute node 121 includes a set of one or more PEs 122 and a memory 124 that stores DP executable 138. PEs 122 execute DP executable 138 and store the results generated by DP executable 138 in memory 124. In particular, PEs 122 execute DP executable 138 to apply an agile communication operator 12 to an input indexable type 14 to generate an output indexable type 18 as shown in FIG. 4 and described in additional detail above.

A compute node 121 that has one or more computational resources with a hardware architecture that is optimized for data parallel computing (i.e., the execution of DP programs or algorithms) is referred to as a DP optimal compute node 121. Examples of a DP optimal compute node 121 include a node 121 where the set of PEs 122 includes one or more GPUs and a node 121 where the set of PEs 122 includes the set of SIMD units in a general purpose processor package. A compute node 121 that does not have any computational resources with a hardware architecture that is optimized for data parallel computing (e.g., processor packages with only general purpose processing elements 102) is referred to as a non-DP optimal compute node 121. In each compute node 121, memory 124 may be separate from memory system 104 (e.g., GPU memory used by a GPU) or a part of memory system 104 (e.g., memory used by SIMD units in a general purpose processor package).

Host 101 forms a host compute node that is configured to provide DP executable 138 to a compute node 121 for execution and receive results generated by DP executable 138 using interconnections 114. The host compute node includes is a collection of general purpose computational resources (i.e., general purpose processing elements 102) that share a memory hierarchy (i.e., memory system 104). The host compute node may be configured with a symmetric multiprocessing architecture (SMP) and may also be configured to maximize memory locality of memory system 104 using a non-uniform memory access (NUMA) architecture, for example.

OS 132 of the host compute node is configured to execute a DP call site to cause a DP executable 138 to be executed by a DP optimal or non-DP optimal compute node 121. In embodiments where memory 124 is separate from memory system 104, the host compute node causes DP executable 138 and one or more indexable types 14 to be copied from memory system 104 to memory 124. In embodiments where memory system 104 includes memory 124, the host compute node may designate a copy of DP executable 138 and/or one or more indexable types 14 in memory system 104 as memory 124 and/or may copy DP executable 138 and/or one or more indexable types 14 from one part of memory system 104 into another part of memory system 104 that forms memory 124. The copying process between compute node 121 and the host compute node may be a synchronization point unless designated as asynchronous.

The host compute node and each compute node 121 may concurrently execute code independently of one another. The host compute node and each compute node 121 may interact at synchronization points to coordinate node computations.

In one embodiment, compute engine 120 represents a graphics card where one or more graphics processing units (GPUs) include PEs 122 and a memory 124 that is separate from memory system 104. In this embodiment, a driver of the graphics card (not shown) may convert byte code or some other intermediate representation (IL) of DP executable 138 into the instruction set of the GPUs for execution by the PEs 122 of the GPUs.

In another embodiment, compute engine 120 is formed from the combination of one or more GPUs (i.e. PEs 122) that are included in processor packages with one or more general purpose processing elements 102 and a portion of memory system 104 that includes memory 124. In this embodiment, additional software may be provided on computer system 100 to convert byte code or some other intermediate representation (IL) of DP executable 138 into the instruction set of the GPUs in the processor packages.

In further embodiment, compute engine 120 is formed from the combination of one or more SIMD units in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the SIMD units in the processor packages.

In yet another embodiment, compute engine 120 is formed from the combination of one or more scalar or vector processing pipelines in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the scalar processing pipelines in the processor packages.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a compiler in a computer system, the method comprising:
identifying an agile communication operator in data parallel source code configured for execution on one or more data parallel optimal compute nodes; and
generating data parallel executable code from the data parallel source code such that the data parallel executable code implements the agile communication operator by generating an agile indexable type from an input indexable type and a resource map, the agile communication operator to:
facilitate passing the agile indexable type to a data parallel call site in the data parallel source code to cause the input indexable type to be decomposed into a plurality of segments,
generate a segmented computational space, and
assign each of the segments to one of the data parallel optimal compute node as specified by the resource map for distributing the computational space across the data parallel optimal compute nodes.

2. The method of claim 1 wherein the agile output indexable type has a plurality of segments.

3. The method of claim 1 comprising:
generating the data parallel executable code from the data parallel source code such that the data parallel executable code implements the agile communication operator by using a first segment of the agile indexable type on a first one of the one or more data parallel compute nodes and a second segment of the agile indexable type on a second one of the one or more data parallel compute nodes.

4. The method of claim 1 wherein the data parallel source code is coded with a full global-view representation of the agile indexable type.

5. The method of claim 1 wherein the data parallel source code is coded with a local-global-view representation of the agile indexable type.

6. The method of claim 1, wherein the data parallel source code is written in a programming language with data parallel extensions.

7. The method of claim 1, wherein the data parallel source code is written in a high level data parallel programming language.

8. The method of claim 1 wherein the one or more data parallel compute nodes include at least one graphics processing unit.

9. The method of claim 1 wherein the one or more data parallel compute nodes include at least one general purpose processor.

10. A system comprising:
processing elements;
memory storing computer executable instructions including a compiler to control the processing elements to:
identify an agile communication operator in data parallel source code configured for execution on one or more data parallel optimal compute nodes; and
generate data parallel executable code from the data parallel source code such that the data parallel executable code implements the agile communication operator by generating an agile indexable type from an input indexable type and a resource map, the agile communication operator to:
facilitate passing the agile indexable type to a data parallel call site in the data parallel source code to cause the input indexable type to be decomposed into a plurality of segments,
generate a segmented computational space, and
assign each of the segments to one of the data parallel optimal compute node as specified by the resource map for distributing the computational space across the data parallel optimal compute nodes.

11. The system of claim 10, wherein the agile indexable type has a plurality of segments.

12. The system of claim 10, the compiler to control the processing elements to:
generate the data parallel executable code from the data parallel source code such that the data parallel executable code implements the agile communication operator by using a first segment of the agile indexable type on a first one of the one or more data parallel optimal compute nodes and a second segment of the agile indexable type on a second one of the one or more data parallel optimal compute nodes.

13. The system of claim 10, wherein the data parallel source code is coded with a full global-view representation of the agile indexable type.

14. The system of claim 10, wherein the data parallel source code is coded with a local-global-view representation of the agile indexable type.

15. The system of claim 10, wherein the one or more data parallel optimal compute nodes include at least one graphics processing unit.

16. The system of claim 10, wherein the one or more data parallel optimal compute nodes include at least one general purpose processor.

17. A computer readable storage memory storing computer-executable instructions to control a computer system to:
identify an agile communication operator in data parallel source code configured for execution on one or more data parallel optimal compute nodes; and
generate data parallel executable code from the data parallel source code such that the data parallel executable code implements the agile communication operator by generating an agile indexable type from an input indexable type and a resource map, the agile communication operator to:
facilitate passing the agile indexable type to a data parallel call site in the data parallel source code to cause the input indexable type to be decomposed into a plurality of segments,
generate a segmented computational space, and
assign each of the segments to one of the data parallel optimal compute node as specified by the resource map for distributing the computational space across the data parallel optimal compute nodes.

18. The computer readable storage memory of claim 17, the computer-executable instructions to control the computer system to:
generate the data parallel executable code from the data parallel source code such that the data parallel executable code implements the agile communication operator by using a first segment of the agile indexable type on a first one of the one or more data parallel optimal compute nodes and a second segment of the agile indexable type on a second one of the one or more data parallel optimal compute nodes.

19. The computer readable storage memory of claim 17, wherein the data parallel source code is coded with a full global-view representation of the agile indexable type.

20. The computer readable storage memory of claim 17, wherein the data parallel source code is coded with a local-global-view representation of the agile indexable type.

\* \* \* \* \*